United States Patent
Hirota et al.

(10) Patent No.: US 8,569,408 B2
(45) Date of Patent: Oct. 29, 2013

(54) ACRYLONITRILE COPOLYMER AND METHOD FOR PRODUCING THE SAME, ACRYLONITRILE COPOLYMER SOLUTION AND POLYACRYLONITRILE PRECURSOR FIBER FOR CARBON FIBER AND METHOD FOR PRODUCING THE SAME

(75) Inventors: Norifumi Hirota, Otake (JP); Yusuke Shinmen, Otake (JP); Naomasa Matsuyama, Otake (JP); Takeshi Nii, Otake (JP); Harumi Shibatani, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 145 days.

(21) Appl. No.: 12/994,526

(22) PCT Filed: May 12, 2009

(86) PCT No.: PCT/JP2009/058840
§ 371 (c)(1),
(2), (4) Date: Feb. 15, 2011

(87) PCT Pub. No.: WO2009/145051
PCT Pub. Date: Dec. 3, 2009

(65) Prior Publication Data
US 2011/0130503 A1    Jun. 2, 2011

(30) Foreign Application Priority Data

May 30, 2008  (JP) ................................. 2008-142446

(51) Int. Cl.
*C08F 20/44* (2006.01)
*C03C 25/28* (2006.01)

(52) U.S. Cl.
USPC ..................... 524/228; 525/329.2; 264/211.1

(58) Field of Classification Search
USPC ..................... 524/228; 525/329.2; 264/211.1
See application file for complete search history.

(56) References Cited

U.S. PATENT DOCUMENTS

| | | | |
|---|---|---|---|
| 4,673,721 A | 6/1987 | Krakkay et al. | |
| 4,683,286 A | 7/1987 | Krakkay et al. | |
| 4,759,853 A | 7/1988 | Krakkay et al. | |
| 4,977,225 A * | 12/1990 | Krakkay et al. | ............... 526/93 |
| 2004/0068069 A1 | 4/2004 | Cerf et al. | |
| 2007/0243377 A1 | 10/2007 | Nishida et al. | |

FOREIGN PATENT DOCUMENTS

| | | |
|---|---|---|
| EP | 0 135 727 A1 | 4/1985 |
| FR | 2 813 319 | 3/2002 |
| JP | 09 13220 | 1/1997 |
| JP | 11 140131 | 5/1999 |
| JP | 11 200140 | 7/1999 |
| JP | 2007 291580 | 11/2007 |
| JP | 2008 75205 | 4/2008 |
| JP | 2008 88616 | 4/2008 |
| WO | 99 10572 | 3/1999 |

OTHER PUBLICATIONS

Extended European Search Report issued May 24, 2011, in Patent Application No. 09754559.4.
International Search Report issued Sep. 8, 2009 in PCT/JP09/058840 filed May 12, 2009.

* cited by examiner

*Primary Examiner* — Robert D. Harlan
(74) *Attorney, Agent, or Firm* — Oblon, Spivak, McClelland, Maier & Neustadt, L.L.P.

(57) ABSTRACT

Disclosed are an acrylonitrile copolymer excellent in thermal stability as a solution (spinning dope) when dissolved in an amide solvent and capable of forming dense polyacrylonitrile fiber suitable for production of carbon fiber, an acrylonitrile copolymer solution in which the acrylonitrile copolymer is dissolved in an amide solvent, and a method for producing polyacrylonitrile precursor fiber for carbon fiber by use of the acrylonitrile copolymer solution. Specifically, an acrylonitrile copolymer contains a sulfonate group derived from a polymerization initiator in an amount of $1.0 \times 10^{-5}$ equivalent/g or more, and the value (equivalent ratio) of (the content of a sulfate group derived from the polymerization initiator/the total content of the sulfonate group and the sulfate group) is 0.4 or less; an acrylonitrile copolymer solution contains the aforementioned acrylonitrile copolymer and an amide solvent.

8 Claims, 3 Drawing Sheets

ACRYLONITRILE COPOLYMER AND METHOD FOR PRODUCING THE SAME, ACRYLONITRILE COPOLYMER SOLUTION AND POLYACRYLONITRILE PRECURSOR FIBER FOR CARBON FIBER AND METHOD FOR PRODUCING THE SAME

TECHNICAL FIELD

The present invention relates to an acrylonitrile copolymer suitable for polyacrylonitrile fiber, in particular, for production of precursor fiber (precursor) for carbon fiber, a method for producing the acrylonitrile copolymer, a solution of the acrylonitrile copolymer, and polyacrylonitrile precursor fiber for carbon fiber and a method for producing the polyacrylonitrile precursor fiber for carbon fiber.

The present application claims the priority of Japanese Patent Application No. 2008-142,446 filed on May 30, 2008, the contents of which are incorporated herein by reference.

BACKGROUND ART

Polyacrylonitrile fiber has characteristics such as bulkiness, texture, and clearness in dying similar to wool, and is used in a variety of uses. Polyacrylonitrile fiber is also generally used as precursor of carbon fiber.

Polyacrylonitrile fiber is generally produced by wet or dry-jet-wet spinning of spinning dope in which an acrylonitrile copolymer is dissolved in an organic or inorganic solvent for transformation of the spinning dope into fiber followed by stretching, washing, and drying for densification of the thus formed fiber.

As a solvent for the spinning dope, an amide solvent such as dimethylformamide or dimethylacetamide, dimethylsulfoxide, or the like is widely used.

However, there is a problem such that storage stability of spinning dope is not good when an amide solvent is used as a solvent for the spinning dope.

As a counter measure for such a problem, for example, there is disclosed a technology in Patent Document 1 in which an acrylonitrile copolymer is dissolved in an amide solvent such as dimethylacetamide in which the content of dimethylamine is not more than a certain amount and hence stability of a thus obtained solution (spinning dope) is improved. By such a technology, gelation and coloring are suppressed in long time storage. However, as for the aforementioned solution, there is a case where stability of the solution under high temperature (thermal stability) is insufficient because, for example, hydrolysis of dimethylacetamide occurs with time under a high temperature and a cyclization reaction of the polymer is allowed to proceed by dimethylamine generated through the hydrolysis.

In Patent Document 2, it is disclosed that polyacrylonitrile fiber is obtained from a solution (spinning dope) in which an acrylonitrile copolymer having not less than a fixed amount of sulfate group and/or sulfonate group at the end of the polymer is dissolved in dimethylacetamide. The polyacrylonitrile fiber thus obtained is excellent in denseness and suitable for production of carbon fiber. However, there is a case where thermal stability of the solution is insufficient, the same as in the aforementioned case.

In Patent Document 3, it is disclosed that viscosity change of a solution (spinning dope) is suppressed by dissolution of an acrylonitrile copolymer having not less than a fixed amount of sulfate group and/or sulfonate group into a solvent such as dimethylsulfoxide which does not have an amide bond. Such a solution is preferable from the viewpoint of stability. However, there is a problem such that polyacrylonitrile fiber obtained by use of the aforementioned solution is inferior in denseness to that obtained by use of an amide solvent.

PRIOR ART REFERENCES

Patent Documents

Patent Document 1: Japanese Patent Application Laid-Open No. Hei 9-13,220
Patent Document 2: International Publication No. WO 1999/10,572
Patent Document 3: Japanese Patent Application Laid-Open No. Hei 11-200,140

DISCLOSURE OF INVENTION

Problem to be Solved by the Invention

The present invention has been made in view of the above-mentioned circumstances and objects of the present invention are to provide an acrylonitrile copolymer excellent in thermal stability as a solution (spinning dope) when dissolved in an amide solvent and capable of forming dense polyacrylonitrile fiber suitable for producing carbon fiber, and a method for producing the same; an acrylonitrile copolymer solution in which the aforementioned acrylonitrile copolymer is dissolved in an amide solvent; and polyacrylonitrile precursor fiber for carbon fiber obtained by use of the aforementioned acrylonitrile copolymer solution, and a method for producing the same.

Means for Solving the Problem

The acrylonitrile copolymer of the present invention is the one comprising a sulfonate group derived from a polymerization initiator in an amount of $1.0 \times 10^{-5}$ equivalent/g or more, a value (equivalent ratio) of (a content of a sulfate group derived from the polymerization initiator/a total content of the sulfonate group and the sulfate group) being 0.4 or less.

The method for producing an acrylonitrile copolymer of the present invention comprises copolymerizing acrylonitrile with a vinyl monomer, using a persulfate and a sulfite as polymerization initiators.

The method for producing an acrylonitrile copolymer of the present invention comprises copolymerizing acrylonitrile with a vinyl monomer, using a persulfate and a sulfite as polymerization initiators, followed by hydrolyzing a sulfate group in a thus obtained copolymer.

The method for producing an acrylonitrile copolymer of the present invention comprises hydrolyzing a sulfate group in a copolymer in a solution of the copolymer.

The acrylonitrile copolymer solution of the present invention comprises the aforementioned acrylonitrile copolymer and an amide solvent.

The method for producing polyacrylonitrile precursor fiber for carbon fiber of the present invention comprises the step of spinning the aforementioned acrylonitrile copolymer solution as spinning dope.

The acrylonitrile precursor fiber for carbon fiber of the present invention comprises an acrylonitrile copolymer having a sulfonate group derived from a polymerization initiator in an amount of $1.0 \times 10^{-5}$ equivalent/g or more, a value (equivalent ratio) of (a content of a sulfate group derived from the polymerization initiator/a total content of the sulfonate group and the sulfate group) being 0.4 or less.

Effect of the Invention

According to the present invention, an acrylonitrile copolymer excellent in thermal stability as a solution (spinning dope) when dissolved in an amide solvent and capable of forming dense polyacrylonitrile fiber suitable for producing carbon fiber; a method for producing the acrylonitrile copolymer; an acrylonitrile copolymer solution in which the aforementioned acrylonitrile copolymer is dissolved in an amide solvent; polyacrylonitrile precursor fiber for carbon fiber, the polyacrylonitrile precursor fiber using the aforementioned acrylonitrile copolymer solution; and a method for producing the polyacrylonitrile precursor fiber can be provided.

BEST MODE FOR CARRYING OUT THE INVENTION

Figure 1:
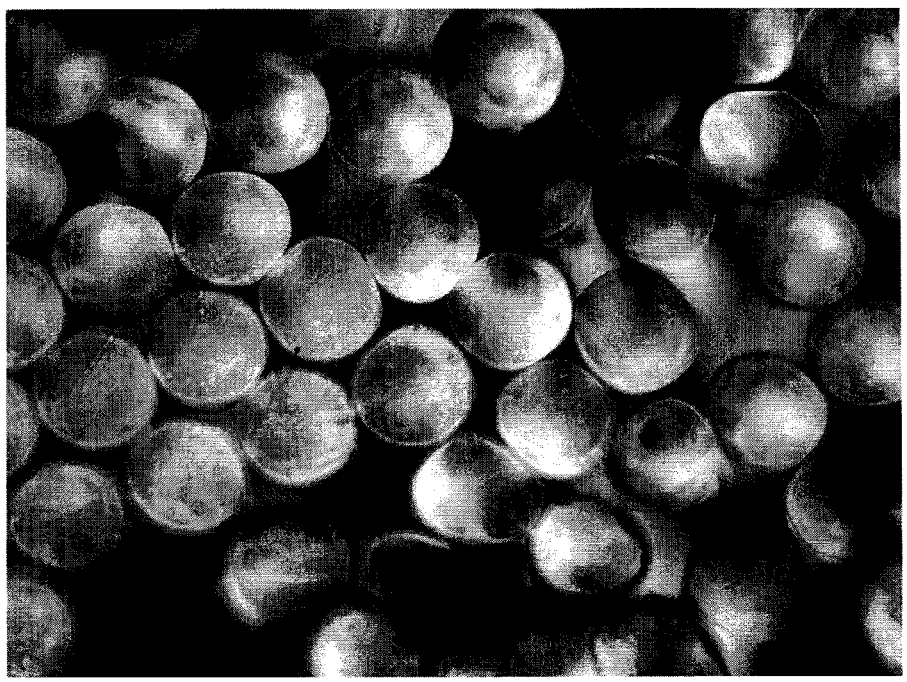
FIG. 1: A micrograph image of a cross section of a coagulated fiber obtained by spinning of a copolymer solution kept at 85° C. for 21 days in Example 1.

<Acrylonitrile Copolymer and Method for Producing the Same>

In the present invention, "acrylonitrile copolymer" means a copolymer containing acrylonitrile units and units of a monomer other than acrylonitrile.

Note that "unit" means repeating unit constituting a polymer.

"Acrylonitrile unit" means a unit formed by cleavage of an ethylenic double bond of acrylonitrile.

Examples of the monomer other than acrylonitrile include vinyl monomers which will be described later.

The proportion of acrylonitrile units in an acrylonitrile copolymer is preferably 90% by mass or more in the total monomer units constituting the acrylonitrile copolymer and more preferably 95% by mass or more in order to reduce defects originated from copolymer constituents other than acrylonitrile in the resulting carbon fiber and improving quality and performance of the resulting carbon fiber.

The upper limit of the proportion of acrylonitrile units is preferably 99.5% by mass or less and more preferably 99% by mass or less taking account of solubility of the copolymer into the solvent.

The acrylonitrile copolymer of the present invention contains a sulfonate group derived from a polymerization initiator as a terminal group of the polymer. The aforementioned acrylonitrile copolymer may contain a sulfate group derived from a polymerization initiator besides the aforementioned sulfonate group. The aforementioned sulfonate group and/or the sulfate group (hereinafter, also collectively referred to as strong acid group) plays an important role in a control of denseness of the fiber to be manufactured by use of the acrylonitrile copolymer.

In the present invention, the content of the aforementioned sulfonate group is $1.0 \times 10^{-5}$ equivalent/g or more and preferably $1.2 \times 10^{-5}$ equivalent/g or more.

When the content of the aforementioned sulfonate group is less than $1.0 \times 10^{-5}$ equivalent/g, it is apprehended that the thermal stability of a solution obtained by dissolution of the acrylonitrile copolymer in an amide solvent becomes bad and hence the number of micro-void is increased in a fiber obtained by spinning of the aforementioned solution after kept under a high temperature for a long time and thus denseness is lowered. The lowering of denseness of the aforementioned fiber causes lowering of performance of a carbon fiber to be finally obtained and thus this is not preferable.

Note that, in the present invention, the content of a functional group in the acrylonitrile copolymer such as sulfonate group or sulfate group means a mole equivalent of the functional group per 1 g of the copolymer.

Although the upper limit of the content of the aforementioned sulfonate group is not particularly limited, the molecular weight of the acrylonitrile copolymer is lowered when the total content of the sulfonate group and the sulfate group (hereinafter, also referred to as the total content of the strong acid group) becomes large. It is apprehended that the lowering of the molecular weight causes lowering of denseness of a fiber to be obtained by use of a solution of the copolymer because the lowering of the molecular weight causes lowering of the viscosity of the solution.

Therefore, the content of the aforementioned sulfonate group is preferably an amount such that the total content of the strong acid group in the acrylonitrile copolymer is less than $4.0 \times 10^{-5}$ equivalent/g and more preferably less than $3.2 \times 10^{-5}$ equivalent/g.

The lower limit of the total content of the strong acid group in the acrylonitrile copolymer is preferably $1.0 \times 10^{-5}$ equivalent/g or more and more preferably $1.2 \times 10^{-5}$ equivalent/g or more taking account of denseness of a fiber to be produced by use of the acrylonitrile copolymer.

In addition, although the acrylonitrile copolymer of the present invention may contain a sulfate group derived from a polymerization initiator, a value (equivalent ratio) of (the content of the aforementioned sulfate group/the total content of the strong acid group) is necessarily to be 0.4 or less and preferably to be less than 0.35, and may be 0. The aforementioned value represents a proportion of the sulfate group in the strong acid group. When the proportion of the aforementioned sulfate group exceeds 0.4 in equivalent ratio, there is a case where the sulfate group at the end of the polymer is hydrolyzed and hence the number of micro-void remarkably increases in a fiber obtained by spinning and thus denseness lowers when a solution obtained by dissolution of the aforementioned acrylonitrile copolymer in an amide solvent is kept under a high temperature for a long time. When the proportion of the aforementioned sulfate group is 0.4 or less in equivalent ratio, the number of micro-void is not increased in a fiber obtained by spinning even in the case where the aforementioned solution is kept under a high temperature for a long time and thus denseness is secured because a sufficient number of the sulfonate group remains without being hydrolyzed.

The cause of the phenomenon in which the number of micro-void remarkably increases when the proportion of the aforementioned sulfate group is large is presumed that the number of the sulfate group at the end of the polymer is reduced by hydrolysis and hence a diffusion rate of water into a fiber at the time of coagulation in the spinning step is increased. Therefore, it is presumed that the stability of the solution with time in the case where the solution is stored under a high temperature for a long time is more improved as the proportion of the sulfate group at the end of the polymer is smaller.

Methods for obtaining the content of the sulfonate group or the value of (the content of the aforementioned sulfate group/the total content of the strong acid group) in the aforementioned acrylonitrile copolymer are exemplified by the following methods, though not limited to them.

The total content of the strong acid group at the end of the polymer in the aforementioned acrylonitrile copolymer (the total content of the sulfonate group and the sulfate group) (as equivalent of sulfur or sulfate ion) is previously determined by elemental analysis or titration of the strong acid group.

Separately, after hydrolysis of the sulfate terminal group through refluxing of the aforementioned acrylonitrile copolymer with an aqueous hydrochloric acid solution, the content of the sulfate group at the end of the polymer is calculated from measurement of the amount of sulfate ion generated in a thus obtained liquid by ion chromatography or the like.

The content of the sulfonate group at the end of the polymer can be obtained by subtraction of the content of the sulfate group from the aforementioned total content of the strong acid group.

In addition, the value of (the content of the aforementioned sulfate group/the total content of the strong acid group) can be obtained by division of the aforementioned content of the sulfate group by the total content of the strong acid group.

In addition, it is also possible to calculate the content of the sulfonate group at the end of the polymer and the value of (the content of the aforementioned sulfate group/the total content of the strong acid group) with a method other than the aforementioned method in such a way that the acrylonitrile copolymer after subjected to hydrolysis is dried and the amount of sulfur derived from the sulfonate terminal group is measured by elemental analysis or the like and then calculation is carried out.

As the aforementioned elemental analysis, a method can be recited in which sulfur oxide (gas) generated by combustion of a sample is absorbed in an aqueous hydrogen peroxide solution and ion chromatography of a thus obtained absorbent liquid is carried out and the content of sulfur as equivalent of sulfate ion is quantitatively analyzed. As a method of combustion for combusting the sample, a combustion boat method, a combustion flask method, and the like can be recited. As a quantitative analysis, ion chromatography, ICP Atomic Emission Spectroscopy, and the like can be recited.

The acrylonitrile copolymer can be produced by copolymerization of acrylonitrile with a monomer other than acrylonitrile in the presence of a polymerization initiator.

In the present invention, strong acid group (sulfonate group and/or sulfate group) derived from the polymerization initiator is introduced at the end of the polymer of the acrylonitrile copolymer.

As a method for introducing the strong acid group derived from the polymerization initiator at the end of the polymer of the acrylonitrile copolymer, a method of using a redox polymerization initiator in which a reducing agent containing a sulfite and an oxidizing agent containing a persulfate are combined can be recited.

As the aforementioned persulfate, ammonium persulfate, sodium persulfate, and potassium persulfate can be recited.

As the aforementioned sulfite, ammonium hydrogen sulfite, sodium hydrogen sulfite, and sodium sulfite can be recited.

In addition, a $Fe^{2+}$ salt such as ferrous sulfate may be added separately as a reducing agent.

In addition, sulfuric acid may be added for the purpose of pH adjustment.

When the aforementioned redox polymerization initiator is used, a sulfate group derived from the aforementioned persulfate and a sulfonate group derived from the aforementioned sulfite are introduced at the end of the polymer of the acrylonitrile copolymer.

Therefore, it is possible to relatively easily adjust the content of the aforementioned sulfonate group or the proportion of the aforementioned sulfate group in the acrylonitrile copolymer to be obtained by control of a combination or a proportion of the persulfate and sulfite in the aforementioned redox polymerization initiator. For example, in the case where the proportion of the aforementioned sulfate group is reduced, polymerization can be carried out with the proportion of the persulfate to be added being reduced.

In addition, in the case where the proportion of the sulfate group is allowed to be 0, polymerization can be carried out without the use of the persulfate.

For example, a polymer in which the proportion of the sulfate group is 0 can be obtained by combined use of a chlorate such as sodium chlorate as an oxidizing agent instead of the sulfate and the sulfite as a reducing agent.

In addition, as a method for reducing the proportion of the sulfate group in the copolymer, a method may be used in which the acrylonitrile copolymer is produced by use of a redox polymerization initiator having a combination of a reducing agent containing the sulfite and an oxidizing agent containing the persulfate and then the sulfate group is hydrolyzed. As a method for hydrolyzing the sulfate group in the copolymer, a method of dispersing the copolymer in an aqueous solution containing an acid such as hydrochloric acid or sulfuric acid and heating it to hydrolyze, a method of dissolving the copolymer in a solvent and then allowing the copolymer to react with water existing in the solvent by keeping the resulting copolymer solution under heat for a long time to decompose the sulfate group, or the like is preferably used.

As the monomer other than acrylonitrile, a vinyl monomer copolymerizable with acrylonitrile can be recited. Examples of the aforementioned vinyl monomer include (meth)acrylates such as methyl(meth)acrylate, ethyl(meth)acrylate, propyl(meth)acrylate, butyl(meth)acrylate, and hexyl(meth)acrylate, halogenated vinyl monomers such as vinyl chloride, vinyl bromide, and vinylidene chloride, acids such as (meth)acrylic acid, itaconic acid, and crotonic acid and salts thereof, maleimide, phenyl maleimide, (meth)acrylimide, styrene, α-methyl styrene, and vinyl acetate. These compounds can be used alone or in a combination of two or more kinds thereof.

In the present invention, a vinyl monomer having a carboxylic acid group is preferably used as the aforementioned vinyl monomer in order to enhance oxidization reactivity in a process of producing carbon fiber by subjecting precursor fiber to heat treatment. Consequently, an acrylonitrile copolymer having a carboxylic acid group can be obtained.

Note that the aforementioned carboxylic acid group can play a role for enhancing oxidization reactivity in the heat treatment step on the one hand, while it might become a defect of carbon fiber on the other hand, therefore it is preferable to control the content of the carboxylic acid group in the acrylonitrile copolymer.

Specifically, the lower limit of the content of the carboxylic acid group in the acrylonitrile copolymer is preferably $5.0 \times 10^{-5}$ equivalent/g or more and more preferably $5.5 \times 10^{-5}$ equivalent/g or more. When the content of the carboxylic acid group is less than $5.0 \times 10^{-5}$ equivalent/g, the oxidization reactivity in the heat treatment step is insufficient and hence a further treatment in a high temperature is needed. The treatment in a high temperature may easily cause a runaway reaction and thus it becomes difficult to obtain a stable property of running through the heat treatment step. By contrast, it becomes necessary to carry out a slow heat treatment so as to suppress the runaway reaction, so that this is not economical and thus not preferable.

In addition, the upper limit of the content of the carboxylic acid group in the acrylonitrile copolymer is preferably $2.0 \times 10^{-4}$ equivalent/g or less and more preferably $1.8 \times 10^{-4}$ equivalent/g or less. When the content of the carboxylic acid group exceeds $2.0 \times 10^{-4}$ equivalent/g, a cyclization reaction of nitrile groups in the polymer becomes fast and hence it might happen that oxidation reaction does not proceed to the inside of the fiber and thus a oxidized structure is formed only in the vicinity of the fiber surface layer. When the fiber has such a structure, it is difficult to suppress decomposition of the center portion of the fiber, where the oxidized structure is insufficiently formed, in a higher temperature of the succeeding carbonization step, and thus performance of the carbon fiber, in particular, tensile modulus is remarkably lowered, and thus this is not preferable.

The content of the carboxylic acid group in the acrylonitrile copolymer can be controlled by control of the proportion of the vinyl monomer having a carboxylic acid group in the total monomers to be used.

Examples of the vinyl monomer having a carboxylic acid group include acrylic acid, methacrylic acid, itaconic acid, maleic acid, fumaric acid, and crotonic acid. Among these compounds, acrylic acid, methacrylic acid, and itaconic acid are preferable. These compounds can be used alone or in a combination of two or more kinds thereof.

In addition, acrylamide may be used as the aforementioned vinyl monomer. The oxidization reactivity and the rate of the thermal cyclization reaction in the heat treatment step are mainly governed by the content of the carboxylic acid group in the acrylonitrile copolymer, but they are sharply enhanced by coexistence of a small amount of acrylamide units in the acrylonitrile copolymer. In addition, inclusion of acrylamide units in the acrylonitrile copolymer may improve the solubility of the acrylonitrile copolymer in an amide solvent or may improve denseness of the coagulated fiber spun by wet spinning or dry-jet-wet spinning.

The content of acrylamide units in the acrylonitrile copolymer is preferably from 0.5 to 5% by mass and more preferably from 1.0 to 4.0% by mass.

The polymerization method is not critical and a conventional method such as precipitation polymerization in aqueous media, suspension polymerization, solution polymerization, or emulsion polymerization can be used. Among these methods, the precipitation polymerization in aqueous media is preferable because it is excellent in productivity and it can reduce unnecessary components such as residual monomers through a washing step.

As the polymerization condition, a conventional condition to be used in the production of the acrylonitrile copolymer can be used.

For example, the polymerization temperature is preferably 20 to 80° C. and more preferably 40 to 70° C.

In addition, pH is preferably 4 or less and more preferably 3.5 or less from the viewpoint of increase in the rate of oxidation and reduction of a polymerization initiator to be used.

The polymerization can be stopped, for example, by addition of a polymerization terminator.

After the polymerization, it is preferable to remove impurities such as residues like an un-reacted monomer and a polymerization initiator, and others to the utmost from the acrylonitrile copolymer obtained by the polymerization reaction in order to suppress hydrolysis of the sulfate group at the end of the polymer.

<Acrylonitrile Copolymer Solution>

The acrylonitrile copolymer solution of the present invention (hereinafter, also referred to as the solution of the present invention) contains the aforementioned acrylonitrile copolymer and an amide solvent. The solution has a high thermal stability even in the case where an amide solvent is used as a solvent, and can maintain not less than a certain content of the strong acid terminal group of the acrylonitrile copolymer in the solution in the case of long time storage under heat, thereby enabling to produce more dense fiber by spinning. Therefore this solution is suitable for production of polyacrylonitrile fiber, in particular, precursor fiber (precursor) for carbon fiber.

The amide solvent is not critical as long as it can dissolve the acrylonitrile copolymer and a conventional amide solvent can be used for it. Specific examples thereof include dimethylacetamide, dimethylformamide, and N-methylpyrrolidone. These compounds can be used alone or in a combination of two or more kinds thereof.

In the present invention, the amide solvent is preferably dimethylacetamide and/or dimethylformamide and more preferably dimethylacetamide because it is possible to obtain acrylonitrile copolymer fiber having a high denseness.

Although the concentration of the acrylonitrile copolymer (polymer concentration) in the solution of the present invention is not critical, it is preferable for the solution to have not less than a certain polymer concentration as spinning dope so as to obtain dense coagulated fiber at the time of spinning. Therefore, the polymer concentration of the solution of the present invention is preferably 17% by mass or more and more preferably 19% by mass or more. In addition, the aforementioned polymer concentration is preferably 25% by mass or less.

The solution of the present invention can be produced by dissolution of the aforementioned acrylonitrile copolymer into an amide solvent.

As a method for dissolving the acrylonitrile copolymer into an amide solvent, any conventional method can be used.

<Polyacrylonitrile Precursor Fiber for Carbon Fiber and the Method for Producing the Same>

As for the polyacrylonitrile precursor fiber for carbon fiber of the present invention, it is necessary that the acrylonitrile copolymer have a sulfonate group derived from a polymerization initiator in an amount of $1.0 \times 10^{-5}$ equivalent/g or more and that a value (equivalent ratio) of (a content of a sulfate group derived from the polymerization initiator/a total content of the sulfonate group and the sulfate group) be 0.4 or less.

Since the acrylonitrile copolymer has such characteristics as mentioned above, the number of micro-void becomes small at the time of coagulation, and hence the aforementioned precursor fiber has a dense structure, and thus defects of the carbon fiber obtained by heat treatment is decreased and the carbon fiber having excellent characteristics can be obtained.

Although the method for obtaining the content of the sulfonate group or the value of (the content of the aforementioned sulfate group/the content of the total strong acid group) in the acrylonitrile copolymer in the aforementioned precursor fiber has been mentioned above, an operation for removing an oil agent or the like sticking to a sample may be previously carried out, if necessary. As the method for removing an oil agent, a method of extracting and removing the oil agent from the sample by organic solvent under reflux can be preferably used. In addition, a method may also be carried out, if necessary, in which the aforementioned precursor fiber is dissolved in a solvent and a solution is obtained, and the resulting solution is dropped in a poor solvent such as water, and then re-precipitation, filtration, and drying are carried out, and a sample in a powder form is obtained for the subsequent measurement.

The method for producing the polyacrylonitrile precursor fiber for carbon fiber of the present invention contains the step of spinning by use of the aforementioned acrylonitrile copolymer solution as spinning dope.

As the method for spinning, wet spinning, dry-jet-wet spinning, and dry spinning can be adopted, and although any of these methods can be used, wet spinning and dry-jet-wet spinning are preferably used from the viewpoints of productivity of spinning and realization of high strength of the carbon fiber.

In spinning, spinning dope is extruded from a nozzle hole having a circular cross section into a coagulation bath (wet spinning), or spinning dope is extruded from a nozzle pore into air and then introduced into a coagulation bath (dry-jet-wet spinning), and thus a coagulated fiber is obtained.

According to the polymer concentration and the stretch ratio, the spinning draft should be suitably determined so as to yield fibers having a desired denier.

Properties of this coagulated fiber are very important to obtain dense and homogeneous precursor fiber, and when denseness or homogeneity of a fiber structure of the aforementioned precursor fiber is insufficient, defects may be generated and thus performance of carbon fiber may be deteriorated.

Among the properties of the coagulated fiber, important ones include existence of micro-void. Note that micro-void is a generic term of a void having a maximum size of 0.1 to several μm and having spherical, spindle, or cylindrical shape. When there are many micro-voids, the coagulated fiber becomes opaque and thus becomes clouded, but there is almost no micro-void in the coagulated fiber to be obtained in the present invention, so that the coagulated fiber does not become opaque and clouded. A precursor fiber excellent in denseness and uniformity can be obtained from such a coagulated fiber having no micro-void.

In the present invention, the number of micro-void in a coagulated fiber is preferably less than 1 in a length of 1 mm of the coagulated fiber in the fiber direction.

Detection of micro-void or counting thereof can be easily carried out either by direct observation of the coagulated fiber by an optical microscope or by observation of the cross section after cutting of the coagulated fiber with a proper method (such as cutting with a razor blade).

As the coagulation bath, an aqueous solution containing a solvent to be used for spinning dope can be preferably used. Properties of the coagulated fiber can be controlled by adjustment of the condition of the coagulation bath. For example, by adjustment of a concentration of the solvent contained, the coagulated fiber is provided to have a porosity of 50% or less.

The concentration of the solvent contained in the coagulation bath is variable depending on the solvent to be used, and for example, when dimethylacetamide is used, it is preferably 50 to 80% by mass and more preferably 60 to 75% by mass.

In addition, lower temperature of the coagulation bath is better, and the temperature of the coagulation bath is ordinarily 50° C. or lower and more preferably 40° C. or lower. As the temperature is lowered, more dense coagulated fiber can be obtained. Note that as the temperature is lowered, drawing up rate of the coagulated fiber is lowered and thus productivity is lowered, and hence it is preferable to set the temperature in a proper range. The temperature of the coagulation bath is preferably 0° C. or higher and more preferably 5° C. or higher.

The coagulated fiber thus obtained is then passed through conventional steps and formed into polyacrylonitrile precursor fiber for carbon fiber. The aforementioned steps include desolvation, stretching in a coagulation bath, oil agent application, drying, and succeeding stretching after steam stretching or after dry heat stretching.

Carbon fiber can be produced by heat treatment of the aforementioned polyacrylonitrile precursor fiber for carbon fiber. The heat treatment can be carried out by conventional oxidization and carbonization treatments.

EXAMPLES

Hereinafter, the present invention will be explained more specifically with reference to examples, but the present invention is not limited to these examples.

In these examples, "AN" represents acrylonitrile, "AAm" represents acrylamide, and "MAA" represents methacrylic acid.

The methods for measurement and the methods for evaluation used in these examples are as follows.

<(A) Composition of a Copolymer>

The composition of a copolymer (proportion of respective monomer units (mass ratio)) was obtained from integration ratio of chemical shifts in the measurement by 1H-NMR ("GSZ-400 Superconducting FT-NMR", manufactured by JEOL Ltd.), by use of dimethyl sulfoxide-d6 solvent, under the condition of accumulation of 40 times and measurement temperature of 120° C.

The content (equivalent/g) of carboxylic acid group in acrylonitrile copolymer was calculated from mass ratio of methacrylic acid units in the copolymer.

<(B) Quantification of a Sulfonate Group and a Sulfate Group>

(i)

Two percent by mass copolymer dimethylformamide solution was passed through an ion-exchange resin mixed with a cation exchange resin and an anion exchange resin for the removal of ionized impurities, and then passed through a cation exchange resin so as to change strongly acidic group ions into acid types. Subsequently, the total equivalent of a sulfonate group and a sulfate group per 1 g of the copolymer (the content (b) of the total strong acid group at the end of the polymer) was determined by potentiometric titration.

(ii)

Two grams of the copolymer was dispersed in 20 ml of aqueous hydrochloric acid solution having a concentration of 0.1 mol/l, and the resulting dispersion was refluxed at 80° C. for 2 hours so as to hydrolyze a sulfate group at the end of the polymer.

After the hydrolysis, the resulting dispersion was filtrated and quantification of a sulfate group in the liquid portion was carried out by ion chromatography, and the content of a sulfate ion per 1 g of the copolymer (the content (a) of a sulfate group at the end of the polymer) was determined.

(iii)

From the values of (b) and (a) obtained above, the value of (b−a) (the content of a sulfonate group at the end of the polymer) and the value of (a/b) (the content of a sulfate group/the content of the total strong acid group) were calculated, respectively.

<(C) Observation of the Cross Section of a Coagulated Fiber>

Fibers drawn out of a coagulation bath were taken as samples, washed by water, and each fiber was cut by razor blade perpendicularly to the fiber direction and the cross section thereof was observed by an optical microscope.

<(D) Strand Strength and Strand Modulas of Carbon Fiber>

These values were measured in accordance with a method described in JIS R 7601.

Example 1

(1-1)

To a 80 litter polymerization vessel equipped with a turbine stirring blade, 57.4 kg of deionized water and 19.1 kg of a monomer having a compositional ratio shown in Table 1 were previously charged (water/monomer (mass ratio) being 3.0).

Separately, as a redox polymerization initiator, 0.4% by mass of ammonium persulfate, 0.6% by mass of ammonium hydrogen sulfite, 0.3 ppm of ferrous sulfate ($Fe_2SO_4 \cdot 7H_2O$), and 0.07% by mass of sulfuric acid, each relative to the monomer, were dissolved in deionized water respectively and independently, and polymerization initiator solutions were prepared.

The polymerization initiator solutions were continuously supplied to the polymerization vessel and polymerization was carried out. At this time, pH of the reaction liquid was adjusted to 3.0 by supply of the sulfuric acid, the polymerization temperature was kept at 50° C., stirring was sufficiently carried out, and polymerized slurry was taken out of an overflow port of the polymerization vessel in such a way that a mean residence time of a polymer-water dispersion (polymer slurry) became 70 minutes. To the polymerized slurry thus taken out, an aqueous polymerization terminator solution obtained by dissolution of 0.5% by mass of sodium oxalate and 1.5% by mass of sodium bicarbonate into deionized water was added in such a way that pH of the resulting polymer slurry became 5.5 to 6.0, and polymerization was stopped.

A thus prepared polymer slurry was subjected to dehydration treatment with Oliver continuous filter, and the filter cake was dispersed in deionized water at 70° C. having a mass 10 times as much as that of the polymer and transformed into polymer slurry again. Subsequently, the resulting polymer slurry was subjected to dehydration treatment with Oliver continuous filter again, the filter cake was formed into pellets, dried at 80° C. for 8 hours with a hot air circulating dryer, crashed with a hammer mill, and powder was obtained. A thus obtained powder was added into dimethylacetamide and dissolved by heat in such a way that 5% by mass polymer solution was obtained, and the resulting solution was dropped slowly into deionized water having a mass about 20 times as much as that of the polymer solution while being mixed with a mixer and the polymer was re-precipitated, filtrated again, subjected to dehydration treatment, formed into pellets, dried at 80° C. for 8 hours with a hot air circulating dryer, crashed with a hammer mill, and thus copolymer A was obtained.

The composition, (a), (b), (b−a), and (a/b) of copolymer A were measured. The results are shown in Table 2.

(1-2)

Copolymer A was dissolved in dimethylacetamide in such a way that 21% by mass copolymer solution was prepared.

The aforementioned copolymer solution (spinning dope) was kept at 85° C. for 21 days and then cooled to 70° C., and extruded through a spinneret having a pore diameter of 0.075 mm and a number of holes of 6,000 into an aqueous dimethylacetamide solution having a concentration of 66% by mass and a bath temperature of 38° C., and coagulated fiber was obtained. This coagulated fiber was transparent and had no micro-void. A microscopic image of a cross section in a plane perpendicular to the fiber direction of the coagulated fiber is shown in FIG. 1. It was clear from the image that there was no micro-void found in the cross section of the coagulated fiber.

(1-3)

The coagulated fiber thus obtained was subjected to 1.5-fold stretching in air and further 3.4-fold stretching in warm water while being subjected to washing and desolvation, and then dipped in a silicone oil agent, and dried and densified by a heating roller at 140° C. Subsequently, the resulting fiber was subjected to 1.5-fold stretching on a heat plate at 180° C., and was wound up at a wind-up speed of 100 m/minute and a precursor fiber having a circular cross section of 1.1 denier was obtained.

This precursor fiber was subjected to oxidization treatment in a hot air circulating oxidization oven at 230 to 260° C. for 50 minutes while being subjected to 5% elongation and was changed into oxidized fiber, and subsequently, the resulting fiber was subjected to low temperature heat treatment at a maximum temperature of 600° C. for 1.5 minutes under nitrogen atmosphere at an elongation rate of 5% and further subjected to heat treatment in a high temperature heat treatment furnace having a maximum temperature of 1,200° C. for about 1.5 minutes under nitrogen atmosphere while being subjected to −4% elongation, and carbon fiber was obtained. The carbon fiber thus obtained had a strand strength of 531 $kg/mm^2$ and a strand modulus of 26.1 $ton/mm^2$.

(1-4)

In addition, the aforementioned copolymer solution kept at 85° C. for 21 days was diluted with dimethylacetamide 4.2 times by mass relative to the copolymer solution and thus a 5% by mass copolymer solution was made, and this solution was dropped slowly into deionized water having a mass about 20 times as much as that of the copolymer solution while being mixed with a mixer and the copolymer was re-precipitated, filtrated, and subjected to dehydration treatment. Then the copolymer was formed into pellets, dried at 80° C. for 8 hours with a hot air circulating dryer, crashed with a hammer mill, and copolymer A' was obtained.

(a), (b), (b−a), and (a/b) of the aforementioned copolymer A' (copolymer A after kept at 85° C. for 21 days) were measured.

Among these values, decrease rate (%) of (a) with respect to (a) before copolymer A was kept at 85° C. for 21 days, [((a) before copolymer A was kept at 85° C. for 21 days−(a) after copolymer A was kept at 85° C. for 21 days)/(a) before copolymer A was kept at 85° C. for 21 days×100], was calculated. It is presumed that this decrease of (a) is caused by hydrolysis of a sulfate group.

Similarly, decrease rate (%) of (b) with respect to (b) before copolymer A was kept at 85° C. for 21 days was calculated.

The results of these values are shown in Table 2.

Example 2

The same procedure as in (1-1) of Example 1 was carried out except that the polymerization condition was changed as shown in Table 1 and copolymer B was obtained. The composition, (a), (b), (b–a), and (a/b) of copolymer B were measured. The results are shown in Table 2.

Figure 2:
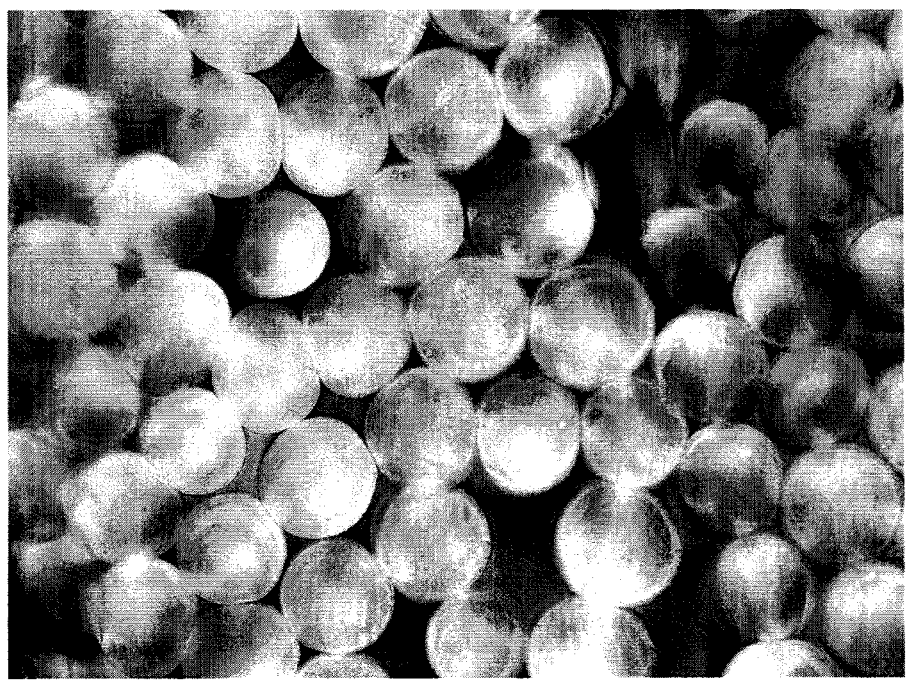
FIG. 2: A micrograph image of a cross section of a coagulated fiber obtained by spinning of a copolymer solution kept at 85° C. for 21 days in Example 2.

The same procedure as in (1-2) of Example 1 was carried out except that the aforementioned copolymer B was used and a copolymer solution (spinning dope) was prepared. This solution was kept at 85° C. for 21 days and then the same procedure as in (1-2) of Example 1 was carried out and coagulated fiber was produced. A microscopic image of a cross section in a plane perpendicular to the fiber direction of the coagulated fiber is shown in FIG. 2. It was clear from the image that there was no micro-void found in the cross section of the coagulated fiber.

The same procedure as in (1-3) of Example 1 was carried out by use of the coagulated fiber thus obtained and a precursor fiber having a circular cross section of 1.1 denier was produced. The same procedure as in (1-3) of Example 1 was carried out by use of the precursor fiber thus obtained and carbon fiber was produced. The carbon fiber thus obtained had a strand strength of 501 k g/mm$^2$ and a strand modulus of 25.3 ton/mm$^2$.

In addition, the same re-precipitation treatment as in (1-4) of Example 1 was carried out by use of the aforementioned copolymer solution kept at 85° C. for 21 days and copolymer B' was obtained. (a), (b), (b–a), and (a/b) of the aforementioned copolymer B' were measured.

In addition, in the same manner as in Example 1, decrease rate (%) of (a) with respect to (a) before copolymer B was kept at 85° C. for 21 days and decrease rate (%) of (b) with respect to (b) before copolymer B was kept at 85° C. for 21 days were calculated. The results are shown in Table 2.

Comparative Example 1

The same procedure as in (1-1) of Example 1 was carried out except that the polymerization condition was changed as shown in Table 1 and copolymer C was obtained. The composition, (a), (b), (b–a), and (a/b) of copolymer C were measured. The results are shown in Table 2.

Figure 3:
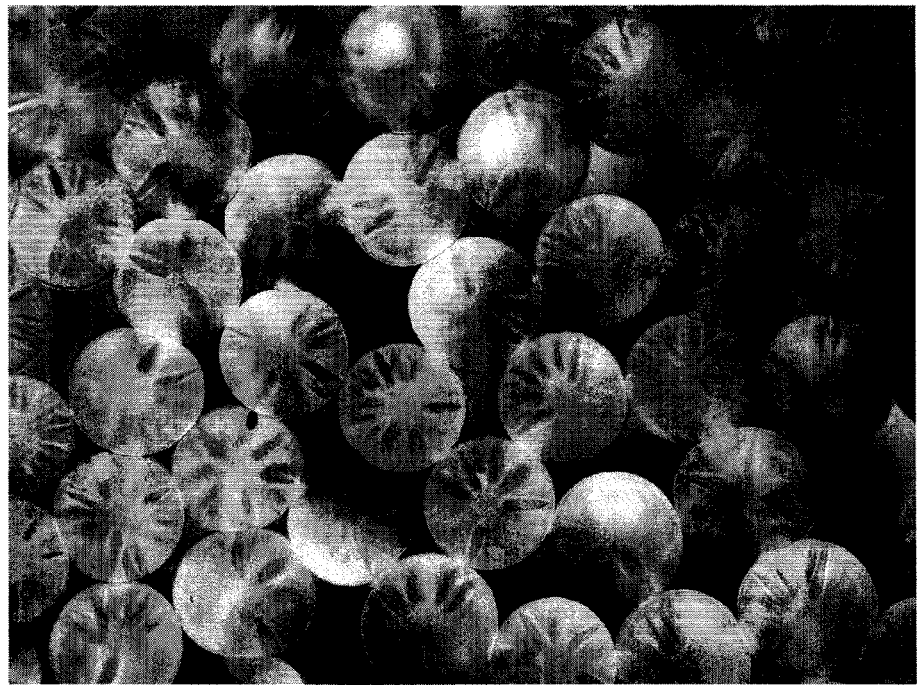
FIG. 3: A micrograph image of a cross section of a coagulated fiber obtained by spinning of a copolymer solution kept at 85° C. for 21 days in Comparative Example 1.

The same procedure as in (1-2) of Example 1 was carried out except that the aforementioned copolymer C was used and a copolymer solution (spinning dope) was prepared. This spinning dope was kept at 85° C. for 21 days and then cooled to 70° C., and extruded into an aqueous dimethylacetamide solution having a concentration of 66% by mass and a bath temperature of 38° C., but coagulated fiber obtained became white, and it was presumed that micro-void was generated. A microscopic image of a cross section in a plane perpendicular to the fiber direction of the coagulated fiber is shown in FIG. 3. It was clear from the image that there were many micro-voids in the cross section of the coagulated fiber.

The same procedure as in (1-3) of Example 1 was carried out by use of the coagulated fiber thus obtained and a precursor fiber having a circular cross section of 1.1 denier was produced. The same procedure as in (1-3) of Example 1 was carried out and carbon fiber was produced. The carbon fiber thus obtained had a strand strength of 380 kg/mm$^2$ and a strand modulus of 22.8 ton/mm$^2$.

In addition, the same re-precipitation treatment as in (1-4) of Example 1 was carried out by use of the aforementioned copolymer solution kept at 85° C. for 21 days and copolymer C' was obtained. (a), (b), (b–a), and (a/b) of the aforementioned copolymer C' were measured.

In addition, the same as in Example 1, decrease rate (%) of (a) with respect to (a) before copolymer C was kept at 85° C. for 21 days and decrease rate (%) of (b) with respect to (b) before copolymer C was kept at 85° C. for 21 days were calculated. The results are shown in Table 2.

Example 3

The same procedure as in (1-1) of Example 1 was carried out except that the polymerization condition was changed as shown in Table 1 and copolymer D was obtained. The composition, (a), (b), (b–a), and (a/b) of copolymer D were measured. The results are shown in Table 2.

The same procedure as in (1-2) of Example 1 was carried out except that the aforementioned copolymer D was used and a copolymer solution (spinning dope) was prepared. This solution was kept at 85° C. for 21 days and then the same procedure as in (1-2) of Example 1 was carried out and coagulated fiber was produced. There was no micro-void found in the cross section of the coagulated fiber.

The same procedure as in (1-3) of Example 1 was carried out by use of the coagulated fiber thus obtained and a precursor fiber having a circular cross section of 1.1 denier was produced. The same procedure as in (1-3) of Example 1 was carried out by use of the precursor fiber thus obtained and carbon fiber was produced. The carbon fiber thus obtained had a strand strength of 515 k g/mm$^2$ and a strand modulus of 25.8 ton/mm$^2$.

In addition, the same re-precipitation treatment as in (1-4) of Example 1 was carried out by use of the aforementioned copolymer solution kept at 85° C. for 21 days and copolymer D' was obtained. (a), (b), (b–a), and (a/b) of the aforementioned copolymer D' were measured.

In addition, the same as in Example 1, decrease rate (%) of (a) with respect to (a) before copolymer D was kept at 85° C. for 21 days and decrease rate (%) of (b) with respect to (b) before copolymer D was kept at 85° C. for 21 days were calculated.

The oil agent of the precursor fiber was removed by refluxing of the fiber with acetone for 4 hours and then 5% by mass precursor fiber solution in dimethylacetamide was obtained. This solution was dropped slowly into deionized water having a volume about 20 times as much as that of the precursor fiber while being mixed with a mixer and the copolymer in the precursor fiber was re-precipitated, filtrated, subjected to dehydration treatment, formed into pellets, and dried at 80° C. for 8 hours with a hot air circulating dryer, and (a), (b), (b–a), and (a/b) of the copolymer in the aforementioned precursor fiber were measured. The results are shown in Table 2.

Comparative Examples 2 and 3

The same procedure as in (1-1) of Example 1 was carried out except that the polymerization condition was changed as shown in Table 1 and each of copolymers E and F was obtained. The composition, (a), (b), (b–a), and (a/b) of each of copolymers E and F were measured. The results are shown in Table 2.

The same procedure as in (1-2) of Example 1 was carried out except that the aforementioned copolymer E or F was used and a copolymer solution (spinning dope) was prepared. This spinning dope was kept at 85° C. for 21 days and then cooled to 70° C., and extruded into an aqueous dimethylacetamide solution having a concentration of 66% by mass and a bath temperature of 38° C., but coagulated fiber thus obtained became white, and it was presumed that micro-void was generated.

The same procedure as in (1-3) of Example 1 was carried out by use of the coagulated fiber thus obtained and a precursor fiber having a circular cross section of 1.1 denier was produced. The same procedure as in (1-3) of Example 1 was carried out by use of the precursor fiber thus obtained and carbon fiber was produced. A strand strength and a strand modulus of the carbon fiber thus obtained are shown in Table 2.

In addition, the same re-precipitation treatment as in (1-4) of Example 1 was carried out by use of the aforementioned copolymer solution kept at 85° C. for 21 days and copolymer E' or F' was obtained. (a), (b), (b–a), and (a/b) of the aforementioned copolymer E' or F' were measured. In addition, decrease rate (%) of (a) with respect to (a) before copolymer E or F was kept at 85° C. for 21 days and decrease rate (%) of (b) with respect to (b) before copolymer E or F was kept at 85° C. for 21 days were calculated in the same manner as in Example 1.

In addition, (a), (b), (b–a), and (a/b) of the copolymer in the aforementioned precursor fiber were measured in the same as in Example 3. The results are shown in Table 2.

solution after kept at 85° C. for 21 days. In Examples 1 to 3, decrease rate of (b) was small, and there was no micro-void observed in the coagulated fiber to be obtained from the aforementioned solution. From these results, it was confirmed that thermal stability of the solution obtained in each of Examples 1 to 3 was good. In addition, the carbon fiber obtained from the precursor fiber obtained from the aforementioned solution was excellent in strand characteristics.

Example 4

Powder of copolymer A obtained in Example 1 was dispersed in 0.1 mol/L aqueous hydrochloric acid solution having a weight 10 times as much as that of the powder and a dispersion was prepared. The dispersion was refluxed at about 100° C. for 4 hours and then filtered, and the recovered copolymer was washed with deionized water having a volume about 20 times as much as that of the copolymer and then

TABLE 1

| | | | Ex. 1 | Ex. 2 | Ex. 3 | Comp. Ex. 1 | Comp. Ex. 2 | Comp. Ex. 3 | Ex. 7 | Comp. Ex. 5 | Comp. Ex. 6 |
|---|---|---|---|---|---|---|---|---|---|---|---|
| Deionized water (W) | | kg | 57.4 | 57.4 | 57.4 | 57.4 | 57.4 | 57.4 | 57.4 | 57.4 | 57.4 |
| Monomer (M) | | kg | 19.1 | 19.1 | 19.1 | 19.1 | 19.1 | 19.1 | 19.1 | 19.1 | 19.1 |
| Composition ratio | AN | % by mass | 96 | 96 | 96 | 96 | 96 | 96 | 96 | 96 | 96 |
| | AAm | % by mass | 3 | 3 | 3 | 3 | 3 | 3 | 3 | 3 | 3 |
| | MAA | % by mass | 1 | 1 | 1 | 1 | 1 | 1 | 1 | 1 | 1 |
| W/M (mass ratio) | | — | 3 | 3 | 3 | 3 | 3 | 3 | 3 | 3 | 3 |
| Ammonium persulfate (O) | | % by mass | 0.40 | 0.31 | 0.26 | 0.74 | 0.55 | 0.83 | 0.56 | 2.22 | 3.00 |
| Ammonium hydrogen sulfite (R) | | % by mass | 0.60 | 0.62 | 0.78 | 0.37 | 0.55 | 0.25 | 0.67 | 1.11 | 0.90 |
| R/O (mass ratio) | | — | 1.5 | 2.0 | 3.0 | 0.5 | 1.0 | 0.3 | 1.2 | 0.5 | 0.3 |
| Ferrous sulfate | | ppm | 0.3 | 0.3 | 0.3 | 0.3 | 0.3 | 0.3 | 0.3 | 0.3 | 0.3 |
| Sulfuric acid | | % by mass | 0.07 | 0.07 | 0.12 | 0.04 | 0.10 | 0.05 | 0.07 | 0.12 | 0.10 |
| Polymerization temperature | | ° C. | 50 | 50 | 50 | 50 | 50 | 50 | 50 | 50 | 50 |

TABLE 2

| | | | Ex. 1 | Ex. 2 | Ex. 3 | Comp. Ex. 1 | Comp. Ex. 2 | Comp. Ex. 3 |
|---|---|---|---|---|---|---|---|---|
| Composition ratio | AN units | % by mass | 96 | 96 | 96 | 96 | 96 | 96 |
| | AAm units | % by mass | 3 | 3 | 3 | 3 | 3 | 3 |
| | MAA units | % by mass | 1 | 1 | 1 | 1 | 1 | 1 |
| Content of carboxylic acid group | | equivalent/g | $1.2 \times 10^{-4}$ | $1.2 \times 10^{-4}$ | $1.2 \times 10^{-4}$ | $1.2 \times 10^{-4}$ | $1.2 \times 10^{-4}$ | $1.2 \times 10^{-4}$ |
| Before being kept | (a) | equivalent/g | $8.0 \times 10^{-6}$ | $4.0 \times 10^{-6}$ | $3.0 \times 10^{-6}$ | $8.0 \times 10^{-6}$ | $5.0 \times 10^{-6}$ | $1.0 \times 10^{-5}$ |
| | (b) | equivalent/g | $3.1 \times 10^{-5}$ | $2.0 \times 10^{-5}$ | $2.6 \times 10^{-5}$ | $1.5 \times 10^{-5}$ | $1.3 \times 10^{-5}$ | $1.5 \times 10^{-5}$ |
| | (b–a) | equivalent/g | $2.3 \times 10^{-5}$ | $1.6 \times 10^{-5}$ | $2.3 \times 10^{-5}$ | $7.0 \times 10^{-6}$ | $8.0 \times 10^{-6}$ | $5.0 \times 10^{-5}$ |
| | (a/b) | — | 0.26 | 0.2 | 0.12 | 0.53 | 0.38 | 0.67 |
| After being kept (at 85° C. for 21 days) | (a) | equivalent/g | $1.3 \times 10^{-6}$ | $1.0 \times 10^{-6}$ | $1.0 \times 10^{-6}$ | $1.8 \times 10^{-6}$ | $1.0 \times 10^{-6}$ | $2.0 \times 10^{-6}$ |
| | (b) | equivalent/g | $2.4 \times 10^{-5}$ | $1.7 \times 10^{-5}$ | $2.4 \times 10^{-5}$ | $8.8 \times 10^{-6}$ | $9.0 \times 10^{-6}$ | $7.0 \times 10^{-6}$ |
| | (b–a) | equivalent/g | $2.3 \times 10^{-5}$ | $1.6 \times 10^{-5}$ | $2.3 \times 10^{-5}$ | $7.0 \times 10^{-6}$ | $8.0 \times 10^{-6}$ | $5.0 \times 10^{-6}$ |
| | (a/b) | — | 0.05 | 0.06 | 0.04 | 0.20 | 0.11 | 0.29 |
| Decrease rate of (a) | | % | 84 | 75 | 67 | 78 | 80 | 80 |
| Decrease rate of (b) | | % | 23 | 15 | 8 | 41 | 31 | 53 |
| Precursor fiber | (a) | equivalent/g | — | — | $1.0 \times 10^{-6}$ | — | $1.0 \times 10^{-6}$ | $2.0 \times 10^{-6}$ |
| | (b) | equivalent/g | — | — | $2.4 \times 10^{-5}$ | — | $9.0 \times 10^{-6}$ | $7.0 \times 10^{-6}$ |
| | (b–a) | equivalent/g | — | — | $2.3 \times 10^{-5}$ | — | $8.0 \times 10^{-6}$ | $5.0 \times 10^{-6}$ |
| | (a/b) | — | — | — | 0.04 | — | 0.11 | 0.29 |
| Strand strength | | kg/mm² | 531 | 501 | 515 | 380 | 390 | 370 |
| Strand modulas | | ton/mm² | 26.1 | 25.3 | 25.8 | 22.8 | 23.0 | 22.4 |

(a): Content of a sulfate group
(b): Total content of the strong acid group
(b-a): Content of a sulfonate group
(a/b): Content of a sulfate group/Total content of the strong acid group As shown in the results in Table 2, it is obvious that the content of the sulfate group in the copolymer is reduced by hydrolysis and thus the proportion of the sulfonate terminal group is increased by the fact that the copolymer solution has been kept at 85° C. for 21 days. There was not observed any differences in (a), (b), and (a/b) between the copolymer in the copolymer solution after kept at 85° C. for 21 days and the copolymer in the precursor fiber obtained by spinning of the formed into pellets. The pellets were dried at 80° C. for 8 hours with a hot air circulating dryer and crashed with a hammer mill, and copolymer A" was obtained.

The composition, (a), (b), (b–a), and (a/b) of the aforementioned copolymer A" were measured. The results are shown in Table 3.

Copolymer A" was dissolved in dimethylacetamide in such a way that 21% by mass copolymer solution was prepared.

The aforementioned copolymer solution (spinning dope) was set to 70° C., and extruded through a spinneret having a pore diameter of 0.075 mm and a number of holes of 6,000 into an aqueous dimethylacetamide solution having a concentration of 66% by mass and a bath temperature of 38° C., and coagulated fiber was obtained. This coagulated fiber was transparent and had no micro-void.

The same procedure as in Example 1 was carried out by use of the coagulated fiber thus obtained and a precursor fiber having a circular cross section of 1.1 denier was obtained. (a), (b), (b–a), and (a/b) of the copolymer in the aforementioned precursor fiber were measured in the same manner as in Example 3. The results are shown in Table 3.

In addition, the same procedure as in Example 1 was carried out by use of the precursor fiber and carbon fiber was obtained. The carbon fiber thus obtained had a strand strength of 525 k g/mm$^2$ and a strand modulus of 25.6 ton/mm$^2$.

Example 5

The same procedure as in Example 4 was carried out except that copolymer B was used and copolymer B'' was obtained. The composition, (a), (b), (b–a), and (a/b) of copolymer B'' were measured. The results are shown in Table 3.

The same procedure as in Example 3 was carried out by use of copolymer B'' and coagulated fiber was obtained. This coagulated fiber was transparent and had no micro-void.

The same procedure as in Example 1 was carried out by use of the coagulated fiber thus obtained and a precursor fiber having a circular cross section of 1.1 denier was obtained. (a), (b), (b–a), and (a/b) of the copolymer in the precursor fiber were measured in the same manner as in Example 3. The results are shown in Table 3.

In addition, the same procedure as in Example 1 was carried out by use of the precursor fiber and carbon fiber was obtained. The carbon fiber thus obtained had a strand strength of 490 kg/mm$^2$ and a strand modulus of 24.9 ton/mm$^2$.

Comparative Example 4

The same procedure as in Example 4 was carried out except that copolymer C was used and copolymer C'' was obtained. The composition, (a), (b), (b–a), and (a/b) of copolymer C'' were measured. The results are shown in Table 3.

The same procedure as in Example 3 was carried out by use of copolymer C'' and coagulated fiber was obtained. However, the coagulated fiber became white and it was presumed that micro-void was generated.

The same procedure as in Example 1 was carried out by use of the coagulated fiber thus obtained and a precursor fiber having a circular cross section of 1.1 denier was obtained. (a), (b), (b–a), and (a/b) of the copolymer in the precursor fiber were measured in the same manner as in Example 3. The results are shown in Table 3.

In addition, the same procedure as in Example 1 was carried out by use of the precursor fiber and carbon fiber was obtained. The carbon fiber thus obtained had a strand strength of 360 kg/mm$^2$ and a strand modulus of 22.5 ton/mm$^2$.

TABLE 3

|  |  |  | Ex. 4 | Ex. 5 | Comp. Ex. 4 |
|---|---|---|---|---|---|
| Composition ratio | AN units | % by mass | 96 | 96 | 96 |
|  | AAm units | % by mass | 3 | 3 | 3 |
|  | MAA units | % by mass | 1 | 1 | 1 |
| Content of carboxylic acid group |  | equivalent/g | 1.2 × 10$^{-4}$ | 1.2 × 10$^{-4}$ | 1.2 × 10$^{-4}$ |
| Copolymer (after hydrolysis) | (a) | equivalent/g | 0 | 0 | 0 |
|  | (b) | equivalent/g | 2.3 × 10$^{-5}$ | 1.6 × 10$^{-5}$ | 7.0 × 10$^{-6}$ |
|  | (b–a) | equivalent/g | 2.3 × 10$^{-5}$ | 1.6 × 10$^{-5}$ | 7.0 × 10$^{-6}$ |
|  | (a/b) | — | 0 | 0 | 0 |
| Precursor fiber | (a) | equivalent/g | 0 | 0 | 0 |
|  | (b) | equivalent/g | 2.3 × 10$^{-5}$ | 1.6 × 10$^{-5}$ | 7.0 × 10$^{-6}$ |
|  | (b–a) | equivalent/g | 2.3 × 10$^{-5}$ | 1.6 × 10$^{-5}$ | 7.0 × 10$^{-6}$ |
|  | (a/b) | — | 0 | 0 | 0 |
| Strand strength |  | kg/mm$^2$ | 525 | 490 | 360 |
| Strand modulas |  | ton/mm$^2$ | 25.6 | 24.9 | 22.5 |

(a): Content of a sulfate group
(b): Total content of the strong acid group
(b–a): Content of a sulfonate group
(a/b): Content of a sulfate group/Total content of the strong acid group As shown in the results in Table 3, it is obvious that the content of the sulfate group in the copolymer becomes zero by hydrolysis caused by reflux treatment with hydrochloric acid. There was not observed any difference in the content of the sulfonate terminal group in the copolymer between the polymer subjected to hydrolysis treatment and the precursor fiber produced therefrom. In Examples 4 and 5, the content of the sulfate group in the copolymer was large, so that there was no micro-void observed in the coagulated fiber to be obtained from the aforementioned solution. In addition, the carbon fiber obtained from the precursor fiber obtained from the aforementioned solution was excellent in strand characteristics.

Example 6

Copolymer A obtained in Example 1 was dissolved in dimethylacetamide in such a way that 21% by mass copolymer solution was prepared.

Figure 4:
FIG. 4: A micrograph image of a cross section of a coagulated fiber obtained by spinning of a copolymer solution in Example 6.

The aforementioned copolymer solution (spinning dope) was then, right after the preparation thereof, set to 70° C., and extruded through a spinneret having a pore diameter of 0.075 mm and a number of holes of 6,000 into an aqueous dimethylacetamide solution having a concentration of 66% by mass and a bath temperature of 38° C., and coagulated fiber was obtained. This coagulated fiber was transparent and had no micro-void. A microscopic image of a cross section in a plane perpendicular to the fiber direction of the coagulated fiber is shown in FIG. 4. It was clear from the image that there was no micro-void found in the cross section of the coagulated fiber.

The same procedure as in Example 1 was carried out by use of the coagulated fiber thus obtained and a precursor fiber having a circular cross section of 1.1 denier was obtained. (a), (b), (b–a), and (a/b) of the copolymer in the aforementioned precursor fiber were measured in the same manner as in Example 3. The results are shown in Table 4.

In addition, the same procedure as in Example 1 was carried out by use of the precursor fiber and carbon fiber was obtained. The carbon fiber thus obtained had a strand strength of 550 kg/mm$^2$ and a strand modulus of 26.6 ton/mm$^2$.

Example 7

The same procedure as in (1-1) of Example 1 was carried out except that the polymerization condition was changed as shown in Table 1 and copolymer G was obtained. The composition, (a), (b), (b–a), and (a/b) of copolymer G were measured. The results are shown in Table 4.

Copolymer G was dissolved in dimethylacetamide in such a way that 21% by mass copolymer solution was prepared.

The aforementioned copolymer solution (spinning dope) was then, right after the preparation thereof, set to 70° C., and extruded through a spinneret having a pore diameter of 0.075 mm and a number of holes of 6,000 into an aqueous dimethylacetamide solution having a concentration of 66% by mass and a bath temperature of 38° C., and coagulated fiber was obtained. This coagulated fiber was transparent and had no micro-void.

The same procedure as in Example 1 was carried out by use of the coagulated fiber thus obtained and a precursor fiber having a circular cross section of 1.1 denier was obtained. (a), (b), (b–a), and (a/b) of the copolymer in the aforementioned precursor fiber were measured in the same manner as in Example 3. The results are shown in Table 4.

In addition, the same procedure as in Example 1 was carried out by use of the precursor fiber and carbon fiber was obtained. The carbon fiber thus obtained had a strand strength of 525 kg/mm$^2$ and a strand modulus of 25.8 ton/mm$^2$.

Comparative Example 5

The same procedure as in (1-1) of Example 1 was carried out except that the polymerization condition was changed as shown in Table 1 and copolymer H was obtained. The composition, (a), (b), (b–a), and (a/b) of copolymer H were measured. The results are shown in Table 4.

Copolymer H was dissolved in dimethylacetamide in such a way that 21% by mass copolymer solution was prepared.

Figure 5:
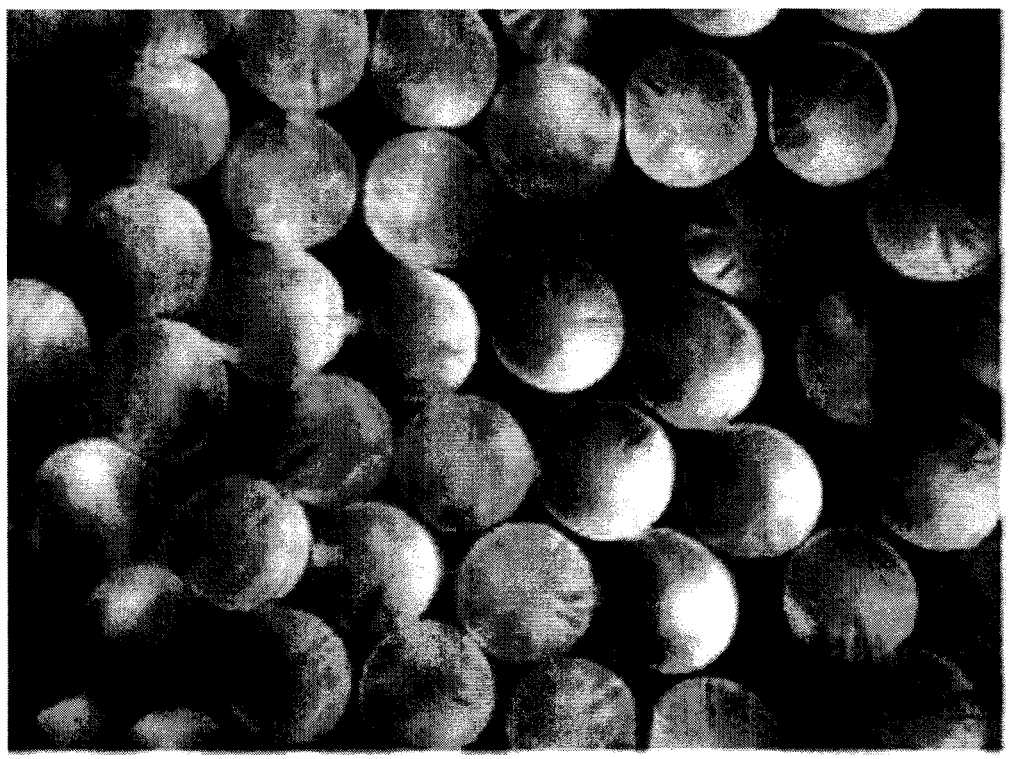
FIG. 5: A micrograph image of a cross section of a coagulated fiber obtained by spinning of a copolymer solution in Comparative Example 5.

The aforementioned copolymer solution (spinning dope) was then, right after the preparation thereof, set to 70° C., and extruded through a spinneret having a pore diameter of 0.075 mm and a number of holes of 6,000 into an aqueous dimethylacetamide solution having a concentration of 66% by mass and a bath temperature of 38° C., but the coagulated fiber thus obtained became white and it was presumed that micro-void was generated. A microscopic image of a cross section in a plane perpendicular to the fiber direction of the coagulated fiber is shown in FIG. 5. It was clear from the image that there were many micro-voids found in the cross section of the coagulated fiber.

The same procedure as in Example 1 was carried out by use of the coagulated fiber thus obtained and a precursor fiber having a circular cross section of 1.1 denier was obtained. (a), (b), (b–a), and (a/b) of the copolymer in the aforementioned precursor fiber were measured in the same manner as in Example 3. The results are shown in Table 4.

In addition, the same procedure as in Example 1 was carried out by use of the precursor fiber and carbon fiber was obtained. The carbon fiber thus obtained had a strand strength of 400 kg/mm$^2$ and a strand modulus of 23.5 ton/mm$^2$.

Comparative Example 6

The same procedure as in (1-1) of Example 1 was carried out except that the polymerization condition was changed as shown in Table 1 and copolymer I was obtained. The composition, (a), (b), (b–a), and (a/b) of copolymer I were measured. The results are shown in Table 4.

Copolymer I was dissolved in dimethylacetamide in such a way that 21% by mass copolymer solution was prepared.

The aforementioned copolymer solution (spinning dope) was then, right after the preparation thereof, set to 70° C., and extruded through a spinneret having a pore diameter of 0.075 mm and a number of holes of 6,000 into an aqueous dimethylacetamide solution having a concentration of 66% by mass and a bath temperature of 38° C., but the coagulated fiber thus obtained became white and it was presumed that micro-void was generated.

The same procedure as in Example 1 was carried out by use of the coagulated fiber thus obtained and a precursor fiber having a circular cross section of 1.1 denier was obtained. (a), (b), (b–a), and (a/b) of the copolymer in the aforementioned precursor fiber were measured in the same manner as in Example 3. The results are shown in Table 4.

In addition, the same procedure as in Example 1 was carried out by use of the precursor fiber and carbon fiber was obtained. The carbon fiber thus obtained had a strand strength of 390 k g/mm$^2$ and a strand modulus of 23.0 ton/mm$^2$.

TABLE 4

| | | | Ex. 6 | Ex. 7 | Comp. Ex. 5 | Comp. Ex. 6 |
|---|---|---|---|---|---|---|
| Composition ratio | AN units | % by mass | 96 | 96 | 96 | 96 |
| | AAm units | % by mass | 3 | 3 | 3 | 3 |
| | MAA units | % by mass | 1 | 1 | 1 | 1 |
| Content of carboxylic acid group | | equivalent/g | $1.2 \times 10^{-4}$ | $1.2 \times 10^{-4}$ | $1.2 \times 10^{-4}$ | $1.2 \times 10^{-4}$ |
| Copolymer (after hydrolysis) | (a) | equivalent/g | $8.0 \times 10^{-6}$ | $8.0 \times 10^{-6}$ | $2.7 \times 10^{-5}$ | $3.2 \times 10^{-5}$ |
| | (b) | equivalent/g | $3.1 \times 10^{-5}$ | $2.4 \times 10^{-5}$ | $5.0 \times 10^{-5}$ | $4.8 \times 10^{-5}$ |
| | (b-a) | equivalent/g | $2.3 \times 10^{-5}$ | $1.6 \times 10^{-5}$ | $2.3 \times 10^{-5}$ | $1.6 \times 10^{-5}$ |
| | (a/b) | — | 0.26 | 0.33 | 0.54 | 0.67 |
| Precursor fiber | (a) | equivalent/g | $5.0 \times 10^{-6}$ | $5.0 \times 10^{-6}$ | $1.6 \times 10^{-5}$ | $2.0 \times 10^{-5}$ |
| | (b) | equivalent/g | $2.8 \times 10^{-5}$ | $2.1 \times 10^{-5}$ | $3.9 \times 10^{-5}$ | $3.6 \times 10^{-5}$ |
| | (b-a) | equivalent/g | $2.3 \times 10^{-5}$ | $1.6 \times 10^{-5}$ | $2.3 \times 10^{-5}$ | $1.6 \times 10^{-5}$ |
| | (a/b) | — | 0.18 | 0.24 | 0.41 | 0.56 |
| Strand strength | | kg/mm$^2$ | 550 | 525 | 400 | 390 |
| Strand modulas | | ton/mm$^2$ | 26.6 | 25.8 | 23.5 | 23.0 |

(a): Content of a sulfate group
(b): Total content of the strong acid group
(b-a): Content of a sulfonate group
(a/b): Content of a sulfate group/Total content of the strong acid group In Comparative Example 5, the content of the sulfonate terminal group in the copolymer was too large, and thus there were many micro-voids in the coagulated fiber obtained from the aforementioned solution, so that the strand characteristics of the carbon fiber obtained from the precursor fiber obtained from the aforementioned solution were low as shown in Table 4.

INDUSTRIAL APPLICABILITY

According to the present invention, an acrylonitrile copolymer excellent in thermal stability as a solution (spinning dope) when dissolved in an amide solvent and capable of forming dense polyacrylonitrile fiber suitable for producing carbon fiber; a method for producing the acrylonitrile copolymer; an acrylonitrile copolymer solution in which the acrylonitrile copolymer is dissolved in an amide solvent; polyacrylonitrile precursor fiber for carbon fiber, the polyacrylonitrile precursor fiber using the acrylonitrile copolymer solution; and a method for producing the polyacrylonitrile precursor fiber can be provided, and thus the present invention is useful in the fields of fiber production and the like.

What is claimed is:

1. An acrylonitrile copolymer comprising a sulfonate group derived from a polymerization initiator in an amount of $1.0 \times 10^{-5}$ equivalent/g or more, an equivalent ratio of a content of a sulfate group derived from the polymerization initiator/a total content of the sulfonate group and the sulfate group being 0.4 or less,
wherein a total content of the sulfonate group and/or the sulfate group in the acrylonitrile copolymer is $1.0 \times 10^{-5}$ equivalent/g or more and less than $4.0 \times 10^{-5}$ equivalent/g.

2. A method for producing the acrylonitrile copolymer according to claim 1, comprising
copolymerizing acrylonitrile with a vinyl monomer in the presence of at least one polymerization initiator selected from the group consisting of a persulfate and a sulfite.

3. A method for producing the acrylonitrile copolymer according to claim 1,
comprising copolymerizing acrylonitrile with a vinyl monomer in the presence of at least one polymerization initiator selected from the group consisting of a persulfate and a sulfite to form a copolymer, then hydrolyzing a sulfate group in the copolymer.

4. The method for producing the acrylonitrile copolymer according to claim 3, wherein hydrolysis of the sulfate group in said copolymer is carried out in a solution comprising said copolymer and an amide solvent.

5. An acrylonitrile copolymer solution comprising the acrylonitrile copolymer according to claim 1 and an amide solvent.

6. The acrylonitrile copolymer solution according to claim 5, wherein the amide solvent is at least one of dimethylacetamide and dimethylformamide.

7. A method for producing polyacrylonitrile precursor fiber for carbon fiber comprising the step of spinning the acrylonitrile copolymer solution according to claim 5 or 6 as spinning dope.

8. Acrylonitrile precursor fiber for carbon fiber to be obtained from coagulated fiber obtained by spinning of an acrylonitrile copolymer solution as spinning dope, an acrylonitrile copolymer in said precursor fiber being the acrylonitrile copolymer according to claim 1.

* * * * *